(12) United States Patent
Burciu

(10) Patent No.: US 11,579,902 B2
(45) Date of Patent: *Feb. 14, 2023

(54) USER INTERFACE RENDERING PERFORMANCE

(71) Applicant: Amazon Technologies, Inc., Seattle, WA (US)

(72) Inventor: Alexandru Burciu, Suceava (RO)

(73) Assignee: Amazon Technologies, Inc., Seattle, WA (US)

(*) Notice: Subject to any disclaimer, the term of this patent is extended or adjusted under 35 U.S.C. 154(b) by 985 days.

This patent is subject to a terminal disclaimer.

(21) Appl. No.: 15/480,712

(22) Filed: Apr. 6, 2017

(65) Prior Publication Data

US 2017/0212657 A1    Jul. 27, 2017

Related U.S. Application Data

(63) Continuation of application No. 12/847,707, filed on Jul. 30, 2010, now Pat. No. 9,626,197.

(51) Int. Cl.
*G06F 3/0485* (2022.01)
*G06F 9/451* (2018.01)
*G06F 40/146* (2020.01)

(52) U.S. Cl.
CPC .......... *G06F 9/451* (2018.02); *G06F 3/0485* (2013.01); *G06F 40/146* (2020.01)

(58) Field of Classification Search
CPC .... G06F 3/0485; G06F 9/451; G06F 17/2252; G06F 40/146
USPC ......................................................... 715/744
See application file for complete search history.

(56) References Cited

U.S. PATENT DOCUMENTS

| | | | | |
|---|---|---|---|---|
| 8,103,742 B1* | 1/2012 | Green | ............... | G06F 16/972 709/218 |
| 8,285,808 B1* | 10/2012 | Joel | ................ | H04L 61/1511 709/213 |
| 2002/0023127 A1* | 2/2002 | Sabeti | .................. | H04L 67/42 709/203 |
| 2003/0058277 A1* | 3/2003 | Bowman-Amuah | | G06F 16/289 715/765 |
| 2003/0137536 A1* | 7/2003 | Hugh | ................. | G06F 9/451 715/744 |
| 2004/0201618 A1* | 10/2004 | Alderson | ........... | G06F 16/9574 715/744 |
| 2006/0143568 A1* | 6/2006 | Milener | .............. | G06F 16/957 715/738 |
| 2006/0184410 A1* | 8/2006 | Ramamurthy | ........ | G06Q 10/10 706/8 |

(Continued)

*Primary Examiner* — Henry Orr
(74) *Attorney, Agent, or Firm* — Thomas | Horstemeyer, LLP

(57) ABSTRACT

Disclosed are various embodiments for improving user interface rendering performance. A network page is received from one or more servers, where the network page includes code that renders a graphical placeholder for a user interface component. The code that renders the graphical placeholder for the user interface component is executed. Code that renders an updated view of the user interface component is received from the server(s) in response to a scrolling action or a viewport manipulation bringing the graphical placeholder for the user interface component into view. The code that renders the updated view of the user interface component is executed.

20 Claims, 6 Drawing Sheets

(56) References Cited

U.S. PATENT DOCUMENTS

| | | | | |
|---|---|---|---|---|
| 2007/0143493 | A1* | 6/2007 | Mullig | H04L 29/06027 709/232 |
| 2008/0144603 | A1* | 6/2008 | Chouksey | H04M 3/42178 370/352 |
| 2008/0195936 | A1* | 8/2008 | White | G06F 9/451 715/246 |
| 2009/0006543 | A1* | 1/2009 | Smit | H04L 67/2842 709/203 |
| 2009/0138937 | A1* | 5/2009 | Erlingsson | H04L 63/1416 726/1 |
| 2009/0210631 | A1* | 8/2009 | Bosworth | G06F 12/0875 711/141 |
| 2011/0029641 | A1* | 2/2011 | Fainberg | G06F 12/0862 709/219 |
| 2011/0119615 | A1* | 5/2011 | Cisler | G06F 9/451 715/772 |
| 2011/0264787 | A1* | 10/2011 | Mickens | G06F 11/3414 709/224 |
| 2013/0167005 | A1* | 6/2013 | Corbett | G06F 16/44 715/234 |

* cited by examiner

USER INTERFACE RENDERING PERFORMANCE

CROSS-REFERENCE TO RELATED APPLICATIONS

This application is a continuation of, and claims priority to, co-pending U.S. Patent Application entitled "IMPROVING USER INTERFACE RENDERING PERFORMANCE," filed on Jul. 30, 2010, and assigned application Ser. No. 12/847,707, which is incorporated herein by reference in its entirety.

BACKGROUND

Network pages, such as web pages, often contain dynamic user interface components that are rendered by client-side code that is executed by the browser application. Such client-side code may comprise code such as Java applets, ActiveX controls, Flash, Java Script, JScript, VBScript, and other forms of client-side code. Such client-side code may be embedded within the network pages or may be in code libraries that are downloaded by way of separate application-level network connections.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to improving user interface rendering performance by delaying the loading of control code associated with user interface components. For example, it may be desirable to include a useful, but uncommonly used, feature within a network page, where the feature is rendered by client-side code. Analysis of rendering performance of the network page may reveal a performance penalty attributable to the inclusion of the feature. Rendering of the top of the network page, for example, may be delayed due to the loading of code for rendering the feature at the bottom of the network page. To improve rendering performance, various embodiments of the present disclosure seek to delay the loading of a portion of the client-side code associated with the feature until a user begins interacting with the user interface of the feature. The initially rendered user interface of the feature allows the user to begin interacting with the feature without significant delay. In the following discussion, a general description of the system and its components is provided, followed by a discussion of the operation of the same.

Figure 1:
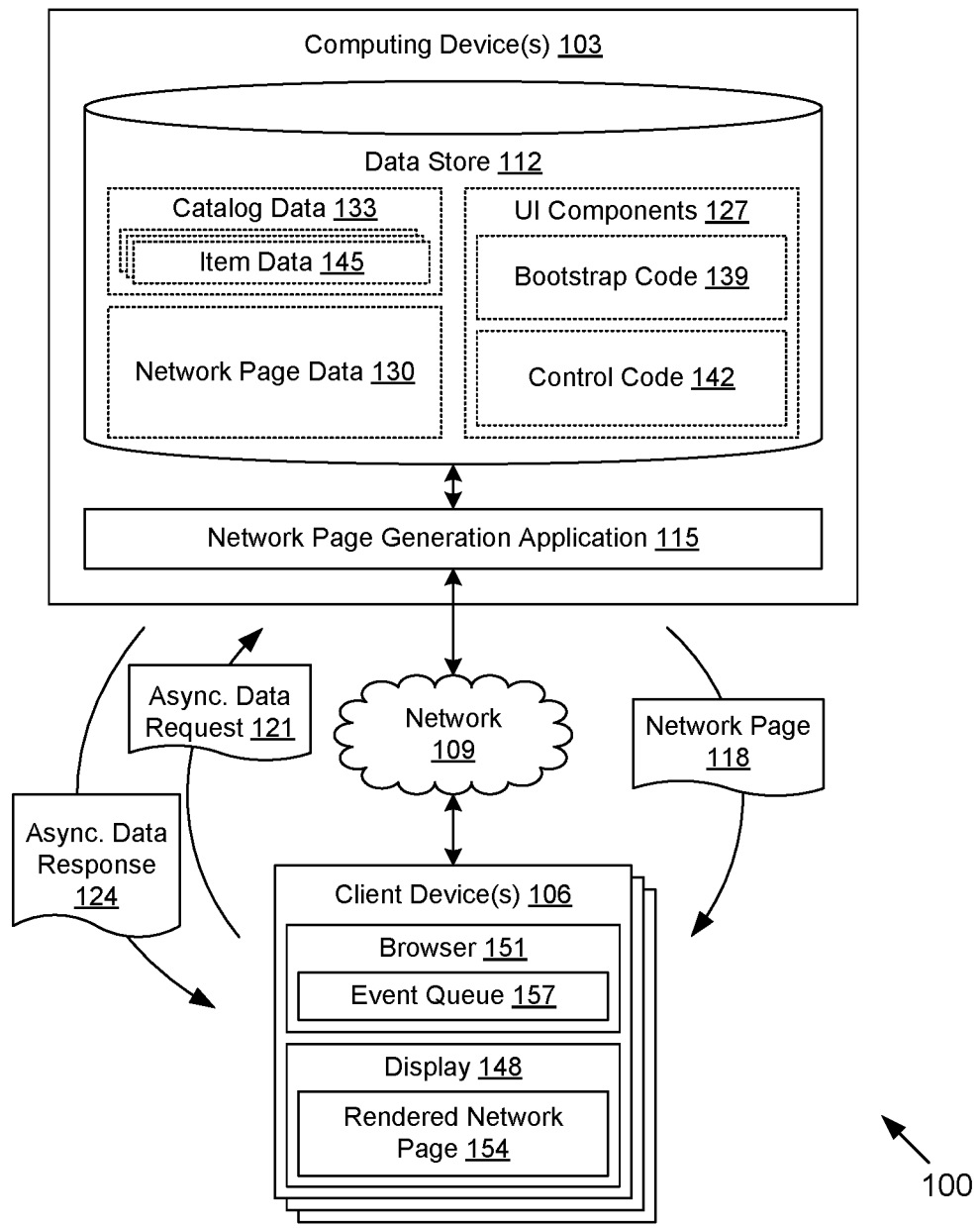
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a network page generation application 115 and other applications, services, processes, systems, engines, or functionality not discussed in detail herein. The network page generation application 115 is executed to generate network pages 118, such as web pages, gopher pages, etc., and to send the network pages 118 over the network 109 to a client device 106. The network pages 118 may be configured to delay loading of one or more user interface components until the user at the client device 106 expresses an interest in, or attempts to use, the respective user interface components. The network page generation application 115 may also be configured to receive asynchronous data requests 121 from the client device 106 and to reply with asynchronous data responses 124. In various embodiments, the network page generation application 115 may include a commercially available hypertext transfer protocol (HTTP) server application such as Apache® HTTP Server, Apache® Tomcat®, Microsoft® Internet Information Services (IIS), or another type of network page server application.

The data stored in the data store 112 includes, for example, user interface components 127, network page data 130, catalog data 133, and potentially other data. The user interface components 127 represent features that may be included within network pages 118 by the network page generation application 115. Such features may employ client-side code execution and the asynchronous exchange of data with the network page generation application 115 or other applications using Ajax, simple object access protocol (SOAP), remote procedure call (RPC), and/or other technologies. A user interface component 127, when rendered, may include any number of user interface elements, such as, for example, checkboxes, buttons, radio buttons, form fields, images, text labels, links, sliders, spinners, drop-down boxes, and so on.

A user interface component 127 may include bootstrap code 139, control code 142, and/or other code. The bootstrap code 139 may be used to render an initial view of the user interface component 127 in the network page 118. In various embodiments, the bootstrap code 139 comprises the minimal amount of client-side code to render the initial view as well as to obtain additional code from the computing device 103. The control code 142 corresponds to the additional code obtained by the bootstrap code 139. The control code 142 may comprise code for imparting functionality to the user interface component 127 and for rendering subsequent views of the user interface component 127 in the client device 106.

The network page data 130 corresponds to any other data used in generating network pages 118. As non-limiting examples, the network page data 130 may include images, graphics, templates, server-side code, video, audio, and other types of network content. One example of data that may be used within the network page 118 and the user interface component 127 by various embodiments is the catalog data 133. The catalog data 133 includes item data 145 related to a catalog of items offered by one or more merchants through a network site. As used herein, the term "item" may refer to a product, good, service, software download, multimedia download, social networking profile, or other item that may be offered for sale, purchase, rental, lease, download, and/or any other form of consumption as may be appreciated. The various data stored in the item data 145 may include titles, descriptions, quantities, images, options, weights, customer reviews, customer ratings, keywords, tags, shipping restrictions, prices, tax classifications, categories, unique identifiers, and any other data related to items.

The client device 106 is representative of a plurality of client devices 106 that may be coupled to the network 109. The client device 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client device 106 may also include a display 148. The display 148 may comprise, for example, one or more devices such as cathode ray tubes (CRTs), liquid crystal display (LCD) screens, gas plasma-based flat panel displays, LCD projectors, or other types of display devices, etc.

The client device 106 may be configured to execute various applications such as a browser 151 and/or other applications. The browser 151 may be executed in a client device 106, for example, to access and render network pages 118, such as web pages, or other network content served up by the computing device 103 and/or other servers, thereby generating a rendered network page 154 on the display 148. The browser 151 may be configured by the network page 118 in various embodiments to maintain an event queue 157. The client device 106 may be configured to execute applications beyond the browser 151 such as, for example, email applications, instant message applications, and/or other applications.

Next, a general description of the operation of the various components of the networked environment 100 is provided. To begin, a user at a browser 151 on a client device 106 requests a network page 118 from the network page generation application 115 over the network 109. The network page generation application 115 generates the network page 118 and sends the network page 118 to the client device 106 over the network 109. The network page 118 is then rendered by the browser 151 as the rendered network page 154 on the display 148. The network page 118 is configured to defer loading of control code related to a user interface component 127 on the rendered network page 154. Such a user interface component 127 may correspond to an interesting feature that may not be used frequently enough to justify a performance overhead associated with automatic rendering of the feature.

In an alternative embodiment, the display area or region corresponding to the user interface component 127 is initially rendered with a graphical placeholder. The placeholder may be maintained until a user scrolls or otherwise manipulates a viewport of the browser 151 to bring the display area and the placeholder into view on the display 148. The bootstrap code 139 may then be loaded. Alternatively, the bootstrap code 139 may be loaded automatically without the display area being in view on the display 148. In some embodiments, no placeholder is provided in the display area.

In various embodiments, the bootstrap code 139 may be included within a code library embedded within, or automatically loaded from, the network page 118. In other embodiments, the bootstrap code 139 may be downloaded from the computing device 103 and loaded dynamically according to the display of the placeholder or some other event. The bootstrap code 139 is executed to render an initial view of the user interface component 127 in the display area. The initial view may appear to be a fully functional user interface for the user interface component 127, but the bootstrap code 139 may be configured to include a minimal amount of code so that the user interface is not in fact fully functional. The bootstrap code 139 may be configured to obtain additional code from the computing device 103 in order to make the user interface fully functional.

When the user manipulates or interacts with the initial view of the user interface component 127, the bootstrap code 139 is configured to obtain the control code 142 from the computing device 103. In one embodiment, the bootstrap code 139 is configured to obtain the control code 142 from the computing device 103 when a user expresses an interest in the user interface component 127, for example, by leaving the initial view of the user interface component 127 or the placeholder on the display 148 for a predefined length of time. The control code 142 implements the controller logic associated with the view, which may involve much more code than the bootstrap code 139 in some embodiments.

Events that correspond to the user interaction, such as clicking on a checkbox, selecting a link, etc., are stored in the event queue 157 while the control code 142 is being obtained. Such events may correspond to document object model (DOM) events in some embodiments. The bootstrap code 139 may be configured to render various placeholders in the initial view of the user interface component 127 to signal to the user that the user interaction is being processed. As a non-limiting example, checking a checkbox in the initial view may cause the checkbox to take on a different appearance to show that the checking action is being processed.

When the control code 142 is obtained, the events in the event queue 157 may be replayed and processed by the control code 142. Such processing may employ asynchronous communication with the computing device 103, which may involve the client device 106 sending one or more asynchronous data requests 121 and receiving one or more asynchronous data responses 124. The control code 142 may then be configured to render an updated or subsequent view of the user interface component 127 on the rendered network page 154.

The browser 151 may be configured to maintain the bootstrap code 139, the control code 142, and other data in a cache. Subsequent renderings of the network page 118 or other network pages 118 may be able to use the cached versions of the bootstrap code 139, the control code 142, and other data. Where the performance overhead of the rendering of the user interface component 127 is primarily in the downloading of the code, automatic rendering by using cached resources would also avoid the performance overhead. However, where the performance overhead is also related to the computational resources of the client device 106 and/or the computing device 103 used in processing the code, it still may be desirable to delay rendering until a user expresses an interest in, or interacts with, the user interface component 127. One specific non-limiting example of a user interface component 127 will be described in connection with FIGS. 2-4.

Although various embodiments of the present disclosure are described with respect to a networked environment 100 having a client/server architecture, the principles of the present disclosure may be extended beyond such an architecture. The principles of the present disclosure formulate a design pattern that may be employed in many different types of user interfaces. To illustrate, it may be desirable to defer loading of control code for a user interface component in a standalone application because it may take a relatively long time to load the control code, for example, through interprocess communication. Additionally, having an event queue 157 to capture the events generated by the user while the control code 142 is being loaded promotes a positive user experience. The design pattern of delaying or deferring the loading of control code for a user interface component may be employed by electronic book readers, video game consoles, cellular telephones, and/or other computing devices.

As a non-limiting example, a video game playable in a video game console may have a richly interactive menu, portions of which are infrequently accessed. A menu portion may correspond to a user interface component 127, and loading of the control code 142 associated with the menu may be delayed until the user begins interacting with the menu portion. Suppose that the menu portion includes playback of a sound in response to clicking on a button. Loading of the control code for processing playback of the sound may be delayed until the button is actually clicked. If the user interacts in other respects with the menu portion, events corresponding to the interactions may be queued for later processing by the control code 142. When the control code 142 is loaded, the queued events may then be replayed and processed. It is understood that the above example is non-limiting and the design pattern may be used in numerous other contexts.

Figure 2:
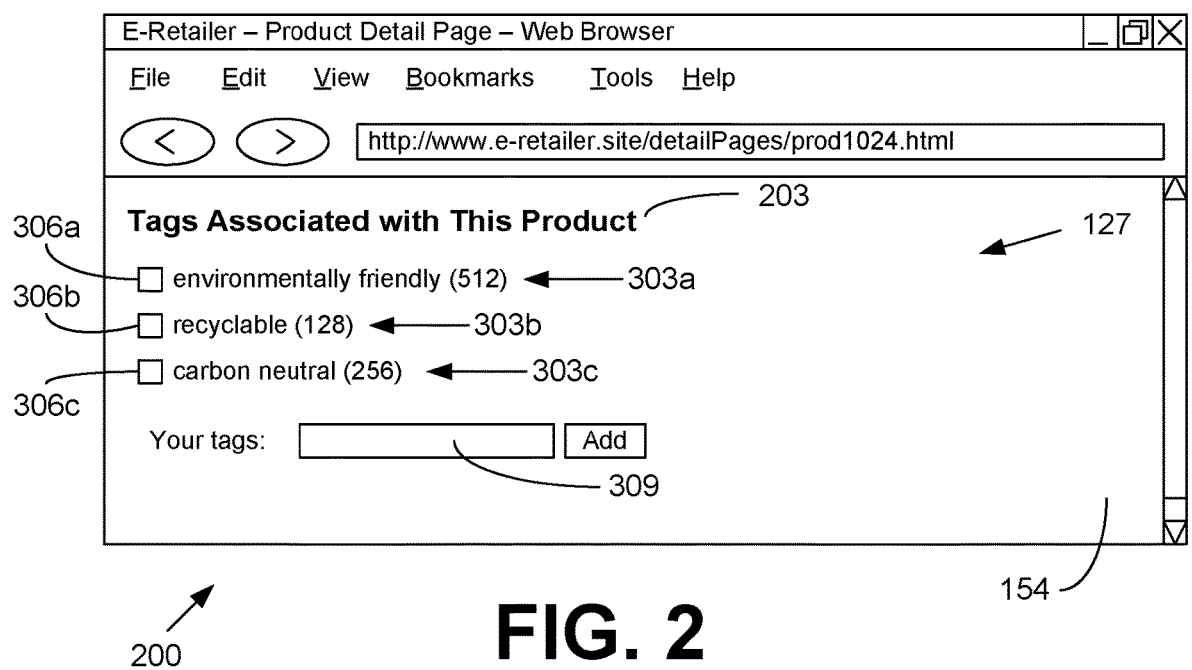
FIGS. 2-4 are drawings of examples of user interfaces rendered by a client device in the networked environment of FIG. 1 according to various embodiments of the present disclosure.

Referring next to FIG. 2, shown is a drawing of a user interface 200 rendered by a browser 151 (FIG. 1) executed in a client device 106 (FIG. 1) in the networked environment 100 (FIG. 1). In particular, the user interface 200 includes a non-limiting example of a rendered network page 154. The rendered network page 154 in FIG. 2 comprises a detail network page 118 (FIG. 1) that includes a user interface component 127 directed to displaying tags associated with an item. A title 203 of the user interface component 127 reads "Tags Associated with This Product," which gives the user an indication of what type of feature will be shown. In FIG. 2, the browser 151 has loaded the bootstrap code 139 (FIG. 1), which has rendered an initial view of the user interface component 127.

The contents of the initial view include tag labels 303a, 303b, and 303c, which each describe tags associated with an item. To this end, the network page generation application 115 may generate or customize the bootstrap code 139 to include data for rendering the tag labels 303 from the item data 145 associated with the item described on the rendered network page 154. In another embodiment, the bootstrap code 139 may be configured to obtain the data for rendering the tag labels 303 asynchronously. Each tag label 303 may include, for example, a tag and a number of customers who have tagged the item with the tag. Checkboxes 306a, 306b, and 306c may be rendered adjacent to the respective tag labels 303. The initial view may also include an add tag component 309 for adding a user-defined tag to the item data 145.

Figure 3:
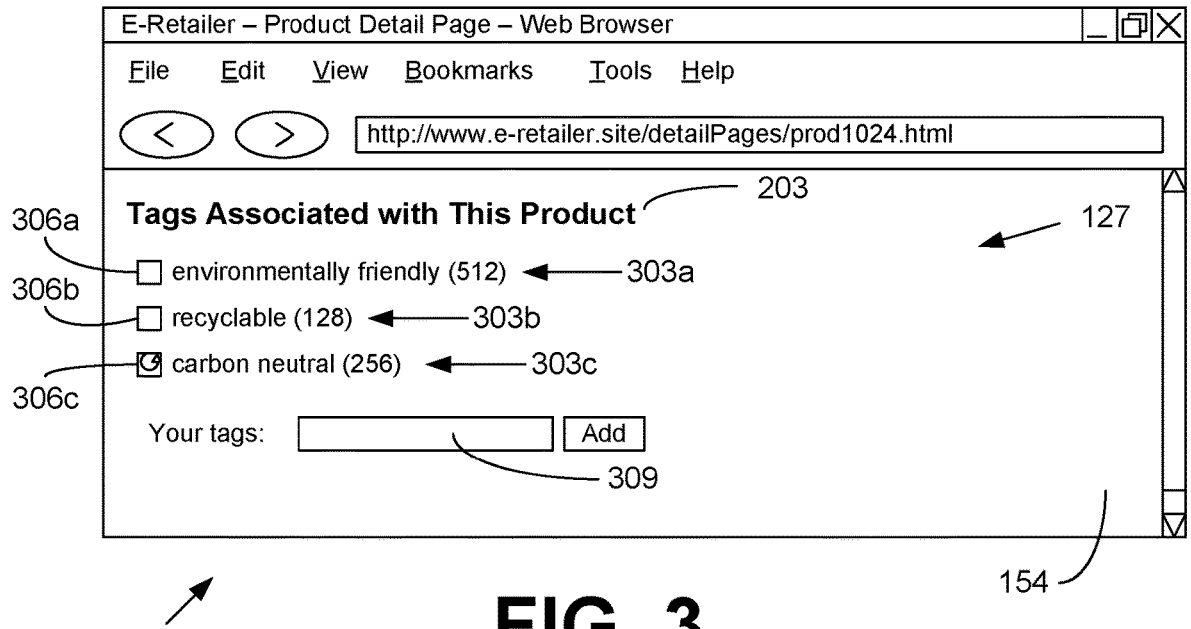

Moving on to FIG. 3, shown is another drawing of the user interface 200 rendered by a browser 151 (FIG. 1) executed in a client device 106 (FIG. 1) in the networked environment 100 (FIG. 1). In particular, the user interface 200 includes another non-limiting example of a rendered network page 154. In FIG. 3, the browser 151 has loaded the bootstrap code 139 (FIG. 1), which has rendered an initial view of the user interface component 127. The user has selected the checkbox 306c corresponding to the tag "carbon neutral." Because the control code 142 (FIG. 1) is not yet loaded in this example, the bootstrap code 139 modifies the initial view to show that the checking event of checkbox 306c is being processed. The bootstrap code 139 adds the checking event to the event queue 157 (FIG. 1) and proceeds to obtain the control code 142.

Although the user interface 200 of FIG. 3 shows only one action taken by a user, it is understood that any number of actions may be taken by the user before the control code 142 is obtained and/or loaded. Such actions may result in multiple events being queued in the event queue 157. In other words, user actions may be non-blocking in various embodiments. Furthermore, the user interface 200 may be multi-modal and involve multiple modes of user interaction. Such modes may include, for example, voice recognition, key presses, mouse clicks, etc.

Figure 4:
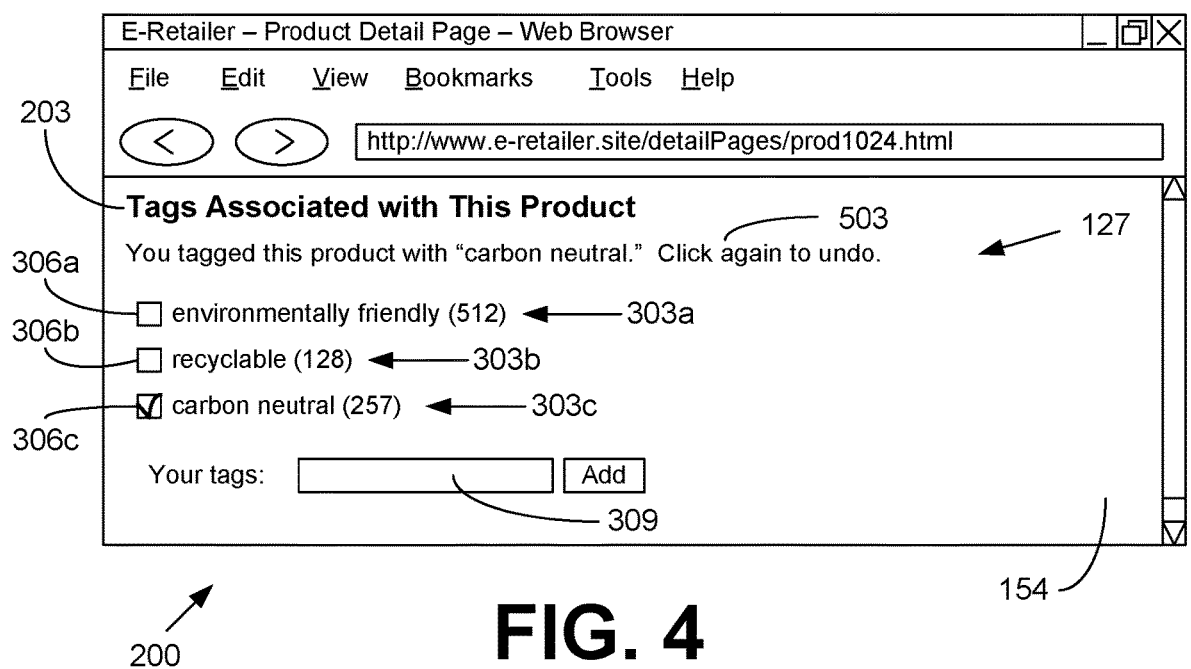

With reference to FIG. 4, shown is another drawing of the user interface 200 rendered by a browser 151 (FIG. 1) executed in a client device 106 (FIG. 1) in the networked environment 100 (FIG. 1). In particular, the user interface 200 includes another non-limiting example of a rendered network page 154. In FIG. 4, the browser 151 has loaded the control code 142 (FIG. 1) and replayed the checking event from the event queue 157 (FIG. 1). Accordingly, an updated view of the user interface component 127 has been rendered by the control code 142 with the checkbox 306c being checked.

In this non-limiting example, the control code 142 has sent an asynchronous data request 121 representing the checking of the "carbon neutral" tag to the computing device 103. The item data 145 is updated to increment the number of customers who have associated the "carbon neutral" tag with the given item. An asynchronous data response 124 may inform the control code 142 of the successful update. Accordingly, the tag label 303c is updated to show that "257" customers have applied the "carbon neutral" tag to the item, which is up from "256" in the preceding figures. Further, the updated view of the user interface component 127 includes a status notification 503 to inform the user that the item has been tagged. The status notification 503 indicates that selecting the checkbox 306c again will undo the action, which is a change in behavior from the initial view. At this point, with the control code 142 being loaded, the add tag component 309 may be fully activated and may be configured to render auto-complete tag suggestions when typing and/or include additional features beyond those present in the initial view of the preceding figures.

Figure 5:
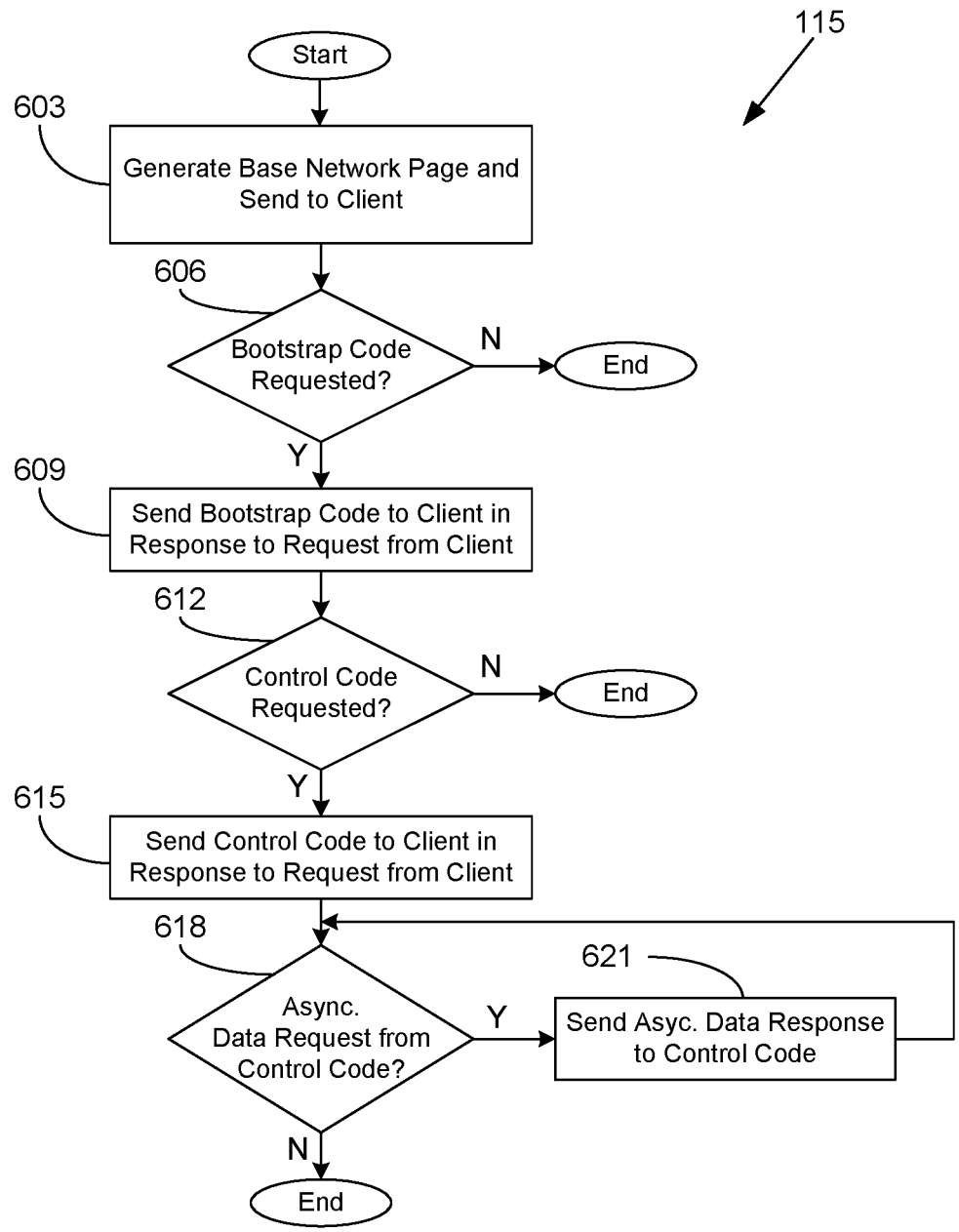
FIG. 5 is a flowchart illustrating one example of functionality implemented as portions of a network page generation application executed in a computing device in the networked environment of FIG. 1 according to various embodiments of the present disclosure.

Referring next to FIG. 5, shown is a flowchart that provides one example of the operation of a portion of the network page generation application 115 according to various embodiments. It is understood that the flowchart of FIG. 5 provides merely an example of the many different types of functional arrangements that may be employed to implement the operation of the portion of the network page generation application 115 as described herein. As an alternative, the flowchart of FIG. 5 may be viewed as depicting an example of steps of a method implemented in the computing device 103 (FIG. 1) according to one or more embodiments.

Beginning with box 603, the network page generation application 115 generates a base network page 118 (FIG. 1) and sends the network page 118 to a client device 106 (FIG. 1). In other embodiments, the bootstrap code 139 (FIG. 1) may be sent as well. The network page 118 may subsequently be rendered by the browser 151 (FIG. 1) executed in the client device 106.

In box 606, the network page generation application 115 determines whether the bootstrap code 139 has been requested. As a non-limiting example, it may be the case that the user never brings a display region corresponding to the user interface component 127 into view on the display 148. Thus, the bootstrap code 139 may not be requested. If the bootstrap code 139 is not requested, the portion of the network page generation application 115 ends.

Otherwise, the bootstrap code 139 is requested by the client device 106. In box 609, the network page generation application 115 sends the bootstrap code 139 to the client device 106 in response to the request by the client device 106. In some embodiments, the bootstrap code 139 may be customized for the network page 118 that includes the user interface component 127, where a user interface component 127 may be shared among several different network pages 118. As a non-limiting example, the bootstrap code 139 for a detail network page 118 may be customized for a particular item described by the detail network page 118.

In box 612, the network page generation application 115 determines whether the control code 142 (FIG. 1) has been requested. As a non-limiting example, it may be the case that the user never interacts with an initial view of the user interface component 127 that is rendered by the bootstrap code 139. Thus, the control code 142 may not be requested. If the control code 142 is not requested, the portion of the network page generation application 115 ends.

Otherwise, the control code 142 is requested by the client device 106. In box 615, the network page generation application 115 sends the control code 142 in response to the request by the client device 106. The control code 142 may be customized for the particular network page 118, similar to the bootstrap code 139. Subsequently, events related to user interaction with the user interface component 127 are processed by the control code 142.

In box 618, the network page generation application 115 determines whether an asynchronous data request 121 (FIG. 1) has been received from the control code 142 on the client device 106. Such an asynchronous data request 121 may be generated by the control code 142 in response to queued events, when loading, or at other times. If an asynchronous data request 121 is received, the network page generation application 115 moves to box 621 and sends an asynchronous data response 124 to the control code 142 on the client device 106. Thereafter, the network page generation application 115 returns to box 618. If, in box 618, the network page generation application 115 determines that no asynchronous data request 121 is received, the portion of the network page generation application 115 ends.

Figure 6:
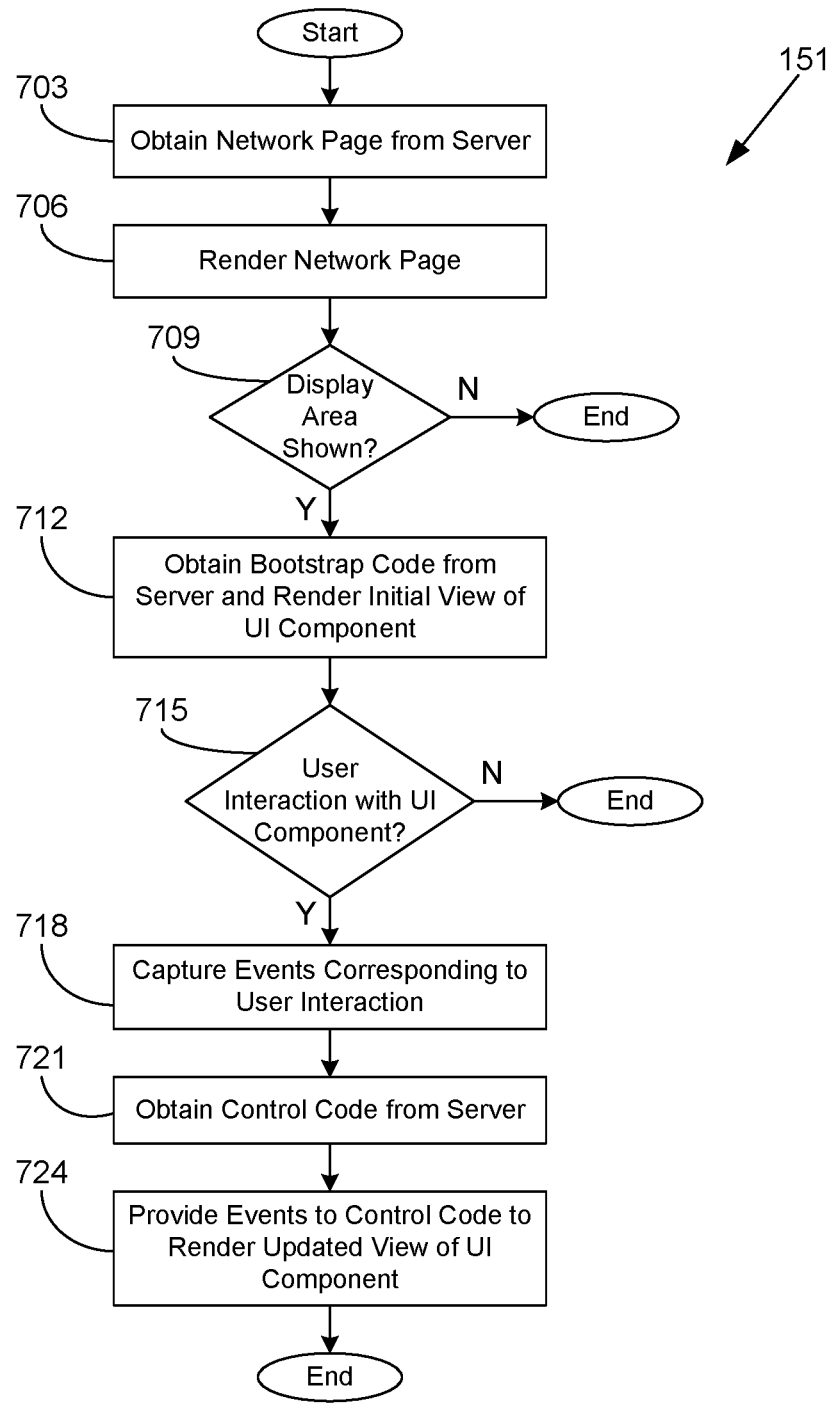
FIG. 6 is a flowchart illustrating one example of functionality implemented as portions of a browser executed in a client device in the networked environment of FIG. 1 according to various embodiments of the present disclosure.

Referring next to FIG. 6, shown is a flowchart that provides one example of the operation of a portion of the browser 151 according to various embodiments. It is understood that the flowchart of FIG. 6 provides merely an example of the many different types of functional arrangements that may be employed to implement the operation of the portion of the browser 151 as described herein. As an alternative, the flowchart of FIG. 6 may be viewed as depicting an example of steps of a method implemented in the client device 106 (FIG. 1) according to one or more embodiments.

Beginning with box 703, the browser 151 obtains a network page 118 (FIG. 1) from a server such as the computing device 103. The network page 118 may be configured to defer loading of code associated with a user interface component 127 (FIG. 1) included in the network page 118. In box 706, the browser 151 renders the network page 118 as a rendered network page 154 (FIG. 1) on the display 148 (FIG. 1). The user may subsequently interact with the browser 151. In box 709, the browser 151 may determine whether a display area associated with the user interface component 127 has been shown. For example, it may be the case that the display area is at the bottom of the rendered network page 154, and the user does not scroll to the bottom. In some embodiments, when the display area is never shown, the portion of the browser 151 ends.

If the bootstrap code 139 (FIG. 1) is otherwise to be loaded, the browser 151 proceeds to box 712. In box 712, the browser 151 obtains the bootstrap code 139 from the computing device 103 and renders the initial view of the user interface component 127 by executing the bootstrap code 139. The initial view of the user interface component 127 appears to be a functional user interface for the user interface component 127.

In box 715, the browser 151 determines whether a user interaction with the initial view of the user interface component 127 has occurred. If no user interaction with the user interface component 127 occurs and the user does not demonstrate an interest in the user interface component 127, the portion of the browser 151 ends. Otherwise, in box 718, the browser 151 executing the bootstrap code 139 proceeds to capture events corresponding to the user interaction in the event queue 157 (FIG. 1).

Next, in box 721, the browser 151 executing the bootstrap code 139 obtains the control code 142 (FIG. 1) from the computing device 103. In box 724, the browser 151 executing the bootstrap code 139 then provides the events from the event queue 157 to the control code 142 in order to render an updated view of the user interface component 127. The browser 151 executing the control code 142 may send asynchronous data requests 121 (FIG. 1) to the computing device 103 and obtain asynchronous data responses 124 (FIG. 1) from the computing device 103. Thereafter, the portion of the browser 151 ends.

Figure 7:
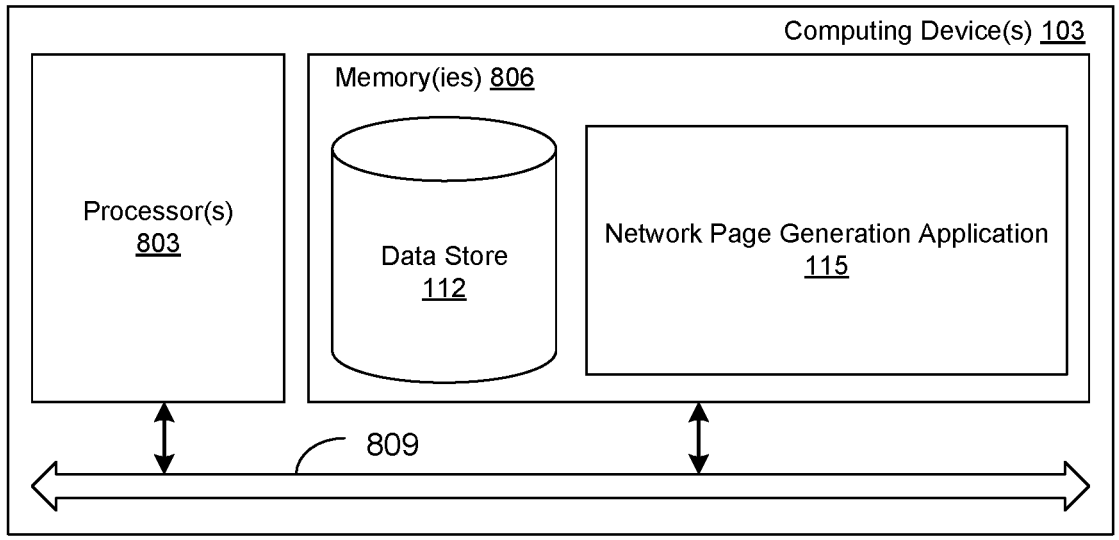
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the network page generation application 115 and potentially other applications. Also stored in the memory 806 may be a data store 112 and other data. In addition, an operating system may be stored in the memory 806 and executable by the processor 803.

Figure 8:
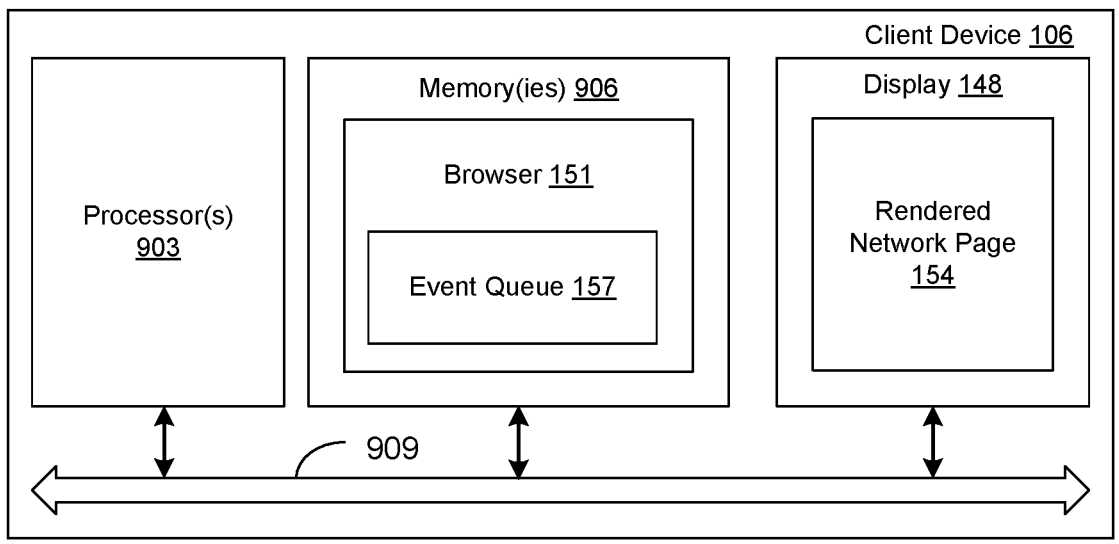
FIG. 8 is a schematic block diagram that provides one example illustration of a computing device employed in the networked environment of FIG. 1 according to various embodiments of the present disclosure.

With reference to FIG. 8, shown is a schematic block diagram of the client device 106 according to an embodiment of the present disclosure. The client device 106 includes at least one processor circuit, for example, having a processor 903, a memory 906, and a display 148, which are coupled to a local interface 909. To this end, the client device 106 may comprise, for example, at least one client computer, such as a desktop computer, a laptop computer, a personal digital assistant, a cellular telephone, set-top box, music players, web pads, tablet computer systems, game consoles, or other devices with like capability. The local interface 909 may comprise, for example, a data bus with an accompanying address/control bus or other bus structure as can be appreciated. The display 148 is configured to show the rendered network page 154.

Stored in the memory 906 are both data and several components that are executable by the processor 903. In particular, stored in the memory 906 and executable by the processor 903 are the browser 151, including the event queue 157, and potentially other applications. Code implementing one or more user interface components 127 (FIG. 1) may also be stored in the memory 906. In addition, an operating system may be stored in the memory 906 and executable by the processor 903.

Referring now to both FIGS. 7 and 8, it is understood that there may be other applications that are stored in the memories 806, 906 and are executable by the respective processors 803, 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 806, 906 and are executable by the respective processors 803, 903. In this respect, the term "executable" means a program file that is in a form that can ultimately be run by the processor 803, 903. Examples of executable programs may be, for example, a compiled program that can be translated into machine code in a format that can be loaded into a random access portion of the memories 806, 906 and run by the respective processor 803, 903, source code that may be expressed in proper format such as object code that is capable of being loaded into a random access portion of the memories 806, 906 and executed by the respective processor 803, 903, or source code that may be interpreted by another executable program to generate instructions in a random access portion of the memories 806, 906 to be executed by the respective processor 803, 903, etc. An executable program may be stored in any portion or component of the memories 806, 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 806, 906 are defined herein as including both volatile and nonvolatile memory and data storage components. Volatile components are those that do not retain data values upon loss of power. Nonvolatile components are those that retain data upon a loss of power. Thus, the memories 806, 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 803, 903 may represent multiple processors 803, 903 and the memories 806, 906 may represent multiple memories 806, 906 that operate in parallel processing circuits, respectively. In such a case, the local interfaces 809, 909 may be an appropriate network 109 (FIG. 1) that facilitates communication between any two of the multiple processors 803, 903, between any processor 803, 903 and any of the memories 806, 906, or between any two of the memories 806, 906, etc. The local interfaces 809, 909 may comprise additional systems designed to coordinate this communication, including, for example, performing load balancing. The processors 803, 903 may be of electrical or of some other available construction.

Although the network page generation application 115, the browser 151, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5 and 6 show the functionality and operation of an implementation of portions of the network page generation application 115 and the browser 151. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 or 903 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation application 115 and the browser 151, that comprises software or code can be embodied in any non-transitory computer-readable medium for use by or in connection with an instruction execution system such as, for example, a processor 803 or 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   a network page generation application executable in the at least one computing device, wherein when executed the network page generation application causes the at least one computing device to at least:
   generate a network page that is configured to defer loading of additional code that renders a user interface component, the network page including code that renders a graphical placeholder for the user interface component, the code that renders the graphical placeholder being configured to:
   store in a queue at least one event corresponding to a scrolling action or a viewport manipulation bringing the graphical placeholder for the user interface component into view;
   load the additional code from a client-side cache in response to the scrolling action or the viewport manipulation bringing the graphical placeholder for the user interface component into view; and
   execute the additional code to render the user interface component.

2. The system of claim 1, wherein the code that renders the graphical placeholder is configured to request the additional code from the at least one computing device.

3. The system of claim 1, wherein the additional code is configured to:
   determine that the graphical placeholder has been rendered on a display at least a predefined length of time;
   receive control code that controls the user interface component from the at least one computing device; and
   execute the control code.

4. The system of claim 1, wherein the user interface component includes a plurality of user interface elements.

5. The system of claim 1, wherein the at least one event corresponds to at least one object that represents a document object model (DOM) event.

6. The system of claim 1, wherein the additional code is configured to:
   determine that a user interaction with the user interface component has occurred;
   receive control code that controls the user interface component from the at least one computing device; and
   execute the control code to process the user interaction.

7. The system of claim 6, wherein the control code is executed to render an updated view of the user interface component in response to a processing of the queue.

8. The system of claim 6, wherein the user interaction comprises a selection of a button of the user interface component, and the control code is configured to process playback of media.

9. A method, comprising:
   receiving, via at least one of one or more computing devices, a network page from at least one server, the network page including code that renders a graphical placeholder for a user interface component;
   executing, via at least one of the one or more computing devices, the code that renders the graphical placeholder for the user interface component;
   storing, via at least one of the one or more computing devices, in a queue at least one event corresponding to a scrolling action or a viewport manipulation bringing the graphical placeholder for the user interface component into view;

in response to the scrolling action or the viewport manipulation bringing the graphical placeholder for the user interface component into view, loading, from a client-side cache and via at least one of the one or more computing devices, code that renders an updated view of the user interface component; and executing, via at least one of the one or more computing devices, the code that renders the updated view of the user interface component.

10. The method of claim 9, further comprising determining, via at least one of the one or more computing devices, that the graphical placeholder has been rendered on a display for at least a predetermined length of time.

11. The method of claim 9, further comprising asynchronously requesting, via at least one of the one or more computing devices, data from the at least one server based at least in part on a user interaction with the updated view of the user interface component.

12. The method of claim 9, wherein the updated view of the user interface component is configured to appear fully functional but lacks at least a portion of functionality.

13. The method of claim 9, wherein the code that renders the updated view of the user interface component further comprises controller logic for the user interface component.

14. The method of claim 9, further comprising:

determining, via at least one of the one or more computing devices, that the graphical placeholder has been rendered on a display at least a predefined length of time;

receiving, via at least one of the one or more computing devices, control code that controls the user interface component from the at least one server; and executing, via at least one of the one or more computing devices, the control code.

15. The method of claim 9, further comprising:

determining, via at least one of the one or more computing devices, that a user interaction with the user interface component has occurred;

receiving, via at least one of the one or more computing devices, control code that controls the user interface component from the at least one server; and executing, via at least one of the one or more computing devices, the control code to process the user interaction.

16. The method of claim 9, wherein the at least one event corresponds to at least one object representing a document object model (DOM) event.

17. A non-transitory computer-readable medium embodying a program executable in at least one computing device, wherein when executed the program causes the at least one computing device to at least:

render a user interface that includes a graphical placeholder for a user interface component;

store in a queue at least one event corresponding to a scrolling action or a viewport manipulation bringing the graphical placeholder for the user interface component into view;

load from a client-side cache additional code that renders the user interface component in response to the scrolling action or the viewport manipulation bringing the graphical placeholder for the user interface component into view; and execute the additional code to render the user interface component.

18. The non-transitory computer-readable medium of claim 17, wherein the program is configured to defer loading of media playback code until a user interacts with an initial view of the user interface component.

19. The non-transitory computer-readable medium of claim 17, wherein the additional code is loaded over a data communications network.

20. The non-transitory computer-readable medium of claim 17, wherein the additional code is loaded via inter-process communication.

* * * * *